United States Patent
Singh et al.

(10) Patent No.: US 10,909,281 B2
(45) Date of Patent: Feb. 2, 2021

(54) HISTORY MATCHING OF HYDROCARBON PRODUCTION FROM HETEROGENOUS RESERVOIRS

(71) Applicant: LANDMARK GRAPHICS CORPORATION, Houston, TX (US)

(72) Inventors: Ajay Pratap Singh, Houston, TX (US); Hasnain A. Khan, Houston, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 325 days.

(21) Appl. No.: 15/765,961

(22) PCT Filed: Dec. 18, 2015

(86) PCT No.: PCT/US2015/066672
§ 371 (c)(1),
(2) Date: Apr. 4, 2018

(87) PCT Pub. No.: WO2017/065813
PCT Pub. Date: Apr. 20, 2017

(65) Prior Publication Data
US 2019/0065640 A1  Feb. 28, 2019

Related U.S. Application Data

(60) Provisional application No. 62/241,441, filed on Oct. 14, 2015.

(51) Int. Cl.
*G06F 30/20* (2020.01)
*E21B 43/00* (2006.01)
(Continued)

(52) U.S. Cl.
CPC .......... *G06F 30/20* (2020.01); *E21B 41/0092* (2013.01); *E21B 43/00* (2013.01); *G06F 2111/06* (2020.01); *G06F 2111/10* (2020.01)

(58) Field of Classification Search
USPC .............................. 703/2, 5; 166/272.3, 283
See application file for complete search history.

(56) References Cited

U.S. PATENT DOCUMENTS

| | | | |
|---|---|---|---|
| 5,146,086 A | 9/1992 | De et al. | |
| 6,140,277 A * | 10/2000 | Tibbles | C09K 8/52 166/270.1 |

(Continued)

FOREIGN PATENT DOCUMENTS

WO  WO-2015030782 A1  3/2015

OTHER PUBLICATIONS

Korean Intellectual Property Office, PCT/US2015/066672, International Search Report and Written Opinion, dated Jul. 11, 2016, 10 pages, Korea.

(Continued)

*Primary Examiner* — Thai Q Phan (57) ABSTRACT

A hydrocarbon field including thief zones can be modeled based on production history data and supplemental data constraining a thief-zone distribution across the field. In various embodiments, a numerical optimization approach involves creating a plurality of model thief-zone distributions with varying parameter values, parameterizing permeability maps obtained for the thief-zone distributions and aggregating across the thief-zone distributions to obtain distributions of coefficients associated with the parameterization, and then iteratively sampling the coefficient distributions, determining a permeability map of the model based on the selected coefficients, and measuring a deviation between the measured production history data and simulated production history data derived from the computational model until a match is achieved.

20 Claims, 9 Drawing Sheets

(51) Int. Cl.
*E21B 41/00* (2006.01)
*G06F 111/06* (2020.01)
*G06F 111/10* (2020.01)

(56) References Cited

U.S. PATENT DOCUMENTS

| | | | |
|---|---|---|---|
| 10,392,905 B2* | 8/2019 | Filippov | E21B 43/12 |
| 10,415,370 B2* | 9/2019 | Pearl, Jr. | C04B 40/0032 |
| 2007/0055447 A1 | 3/2007 | Mickaele et al. | |
| 2009/0089028 A1 | 4/2009 | Sagert et al. | |
| 2010/0010796 A1 | 1/2010 | Hovadik et al. | |
| 2013/0215712 A1* | 8/2013 | Geiser | G01V 1/288 367/9 |
| 2013/0318141 A1 | 11/2013 | Maucec | |
| 2014/0039859 A1 | 2/2014 | Maucec et al. | |
| 2015/0107833 A1* | 4/2015 | Boone | E21B 43/2408 166/272.3 |
| 2015/0247940 A1 | 9/2015 | de Matos Ravanelli et al. | |
| 2016/0201443 A1* | 7/2016 | Nguyen | C09K 8/035 166/283 |

OTHER PUBLICATIONS

M.J. Sullivan, D.L. Belanger, M.T. Skalinski, S.D. Jenkins and P.Dunn, Permeability from Production Logs—Method and Application, Sep. 24-27, 2006, 16 pages, 2006 SPE Annual Technical Conference and Exhibition, SPE 102894, San Antonio, Texas.

B.Jafarpour and D.B. McLaughlin, Reservoir Characterization With the Discrete Cosine Transform, Feb. 26-28, 2007, 20 pages, SPE Reservoir Simulation Symposium, SPE 106453, Houston, Texas.

B.Jafarpour and D.B. McLaughlin, Efficient Permeability Parameterization With the Discrete Cosine Transform, Feb. 26-28, 2007, 9 pages, SPE Reservoir Simulation Symposium, SPE 106453, Houston, Texas.

Harmohan S. Gill and Rayed Al-Zayer, Pressure Transient Derivative Signatures in Presence of Stratiform Super-K Permeability Intervals, Ghawar Arab-D Reservoir, Oct. 5-8, 2003, 14 pages, SPE Annual Technical Conference and Exhibition, Denver, Colorado.

Mohamed Benlacheheb, Haytham Abdulaz Al Meer, Ahmed Kandil, Fraser Ross and Millagritos Rimach, Integration of the PLT and PBU Data in Permeability Modeling Workflow, Dec. 10-12, 2014, 10 pages, International Petroleum Technology Conference, Kuala Lumpur, Malaysia.

Ajay Singh, Marko Maucec and Steven Knabe, History Matching Using Streamline Trajectories, Nov. 10-13, 2014, 11 pages, Abu Dhabi International Petroleum Exhibition and Conference, SPE-172146-MS, Abu Dhabi, UAE.

Europe Patent Office, Application No. 15906405.4, Supplementary European Search Report, dated Apr. 26, 2019, 9 pages, Europe.

* cited by examiner

HISTORY MATCHING OF HYDROCARBON PRODUCTION FROM HETEROGENOUS RESERVOIRS

PRIORITY APPLICATION

This application is a U.S. National Stage patent application of International Patent Application No. PCT/US2015/066672, filed on Dec. 18, 2015, which claims the benefit of U.S. Provisional Application Ser. No. 62/241,441, filed on Oct. 14, 2015, the benefit of both of which are claimed and the disclosure of both of which are incorporated herein by reference in their entireties.

BACKGROUND

In oil and gas field operations, future production from an underground hydrocarbon reservoir within a hydrocarbon field can be estimated based on a computational model of the hydrocarbon field in conjunction with known past production levels. The computational model generally includes a collection of (e.g., differential) equations whose solutions provide the desired production estimates, and which include a number of adjustable petrophysical parameters, such as rock porosity and permeability. The values of these parameters may be adjusted such that past production levels computed from the model match the measured historical production data. This process is known as "history matching."

History matching for small and homogenous reservoirs can often be achieved by changing a few static properties, typically permeability and porosity. Reservoirs that are heterogeneous, faulted, fractured, and/or have a high fraction of dolomites, on the other hand, call for more complex models to properly account for, e.g., compartmentalization of the reservoir due to faults, or connectivity between different wells extracting hydrocarbons from the reservoir due to high-permeability streaks, also known as "thief zones." For large reservoirs, history matching for such complex models can take a few months to even years. This is, in large part, due to the thief zones, which—unlike faults—generally do not show up in seismic data, and are therefore modeled with a large number of adjustable parameters. Geomodeling techniques can be used to determine a thief-zone distribution consistent with measured depths at which the thief zones intersect the individual oil or gas wells, but are generally insufficient to obtain the actual, correct distribution of thief zones.

DETAILED DESCRIPTION

The present disclosure relates generally to system, computer programs embodied on machine-readable media, and methods for characterizing heterogeneous hydrocarbon reservoirs permeated by thief zones and history matching production levels, e.g., for purposes of estimating future production. In various embodiments, history matching is accomplished in two successive stages. In the first stage, field-level production data are integrated with various other sources of information, such as, e.g., production-logging-tool (PLT) data, tracer data, and/or computed streamline trajectories, to adjust field-level parameters (e.g., a mean permeability associated with the thief zones). Then, in the second stage, the thief-zone distribution is optimized based on production data for the individual wells in conjunction with statistics obtained for a plurality of modeled thief-zone distributions. (The terms "optimizing" and "optimized" are used herein with reference to a mathematical optimization technique and its result, and do not imply that an optimal thief-zone distribution in the absolute sense is achieved.) Compared with conventional methods for hydrocarbon-reservoir modeling and history matching, this approach can, in certain embodiments, improve the accuracy of the history match and/or reduce the computing time that elapses until the match is achieved. Example embodiments of the disclosed approach are hereinafter described in detail and with reference to the accompanying drawings.

Figure 1:
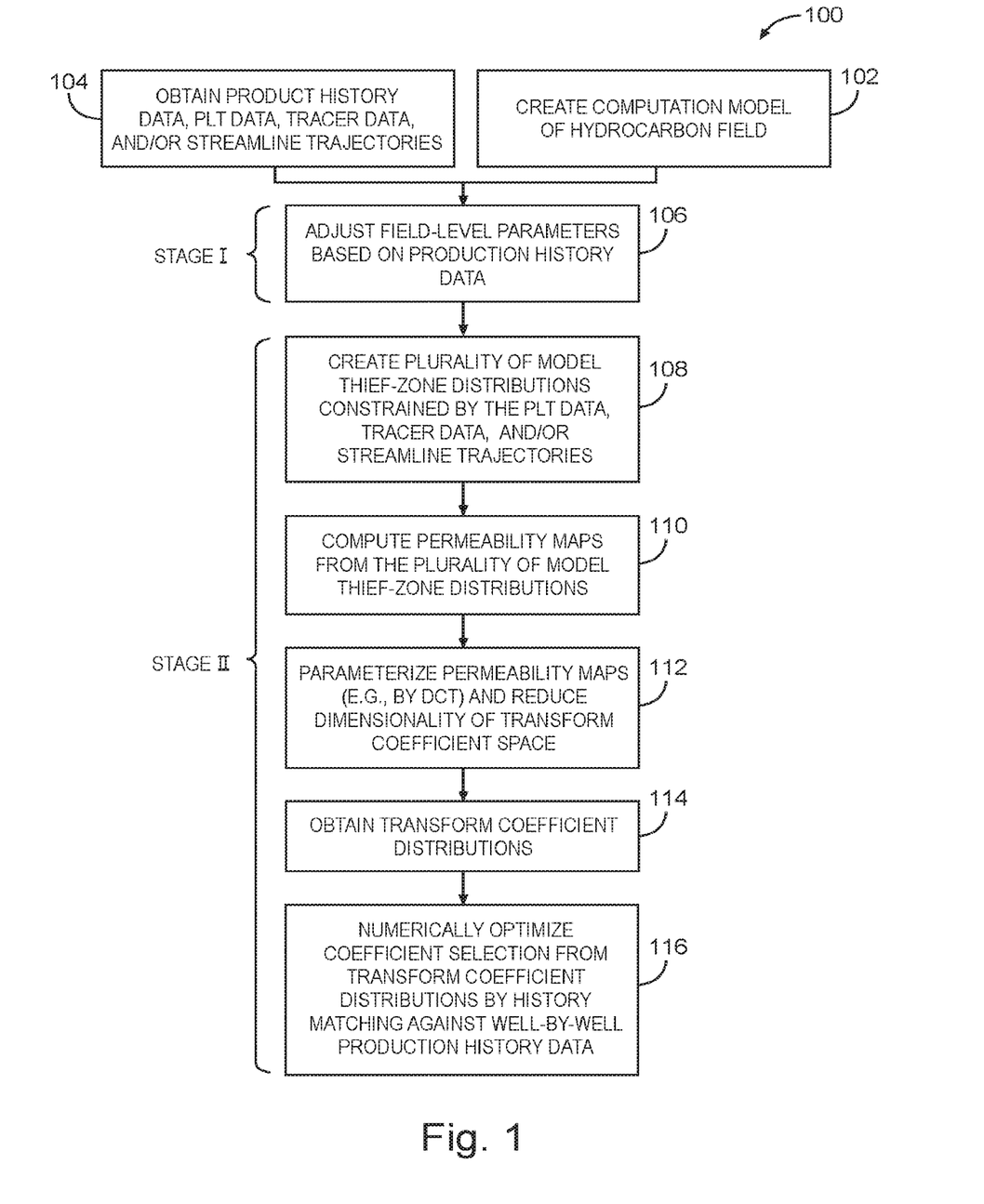
FIG. 1 is a flow chart of a method for history matching heterogeneous hydrocarbon field models, in accordance with various embodiments.

FIG. 1 provides, in the form of a flow chart, an overview of a method 100 for history matching heterogeneous hydrocarbon field models in accordance with various embodiments. The method 100 involves creating an initial computational model of a hydrocarbon field (act 102). The term "hydrocarbon field" denotes herein a three-dimensional region, typically extending from the surface into the ground, that encompasses at least a portion of one or more hydrocarbon reservoirs and includes a plurality of wells for producing hydrocarbons (oil and/or gas) from the reservoir(s). A computational model of a hydrocarbon field includes parameters descriptive of the spatial arrangement and petrophysical properties of the sub-surface formation within the field and, in particular, of the location, extent, and properties of the reservoir(s) (e.g., permeability and porosity and/or net-to-gross pore volume (i.e., the fraction of reservoir volume that is occupied by fluid)) and of the fluid(s) trapped therein (e.g., fluid type, density, and viscosity).

The model may also include parameters for certain geological features that affect fluid flow through the formation, such as faults, fractures, and thief zones. An important parameter of faults is their transmissibility, which may be quantified, e.g., between 0 for a completely sealed fault and 1 for a completely open fault (and may take any value in between for partially open faults). Thief zones—laterally continuous stratigraphic units of relatively high permeability into which circulating fluids can be lost—can be characterized in terms of their location, orientation, thickness, extent in the lateral dimensions, and permeability distribution. The exchange of fluids between the thief zones and surrounding formation influences production from the well, while the extent and orientation of the thief zones affect the connectivity in the reservoir and the water cut at the producing wells when the reservoir is being flooded. The thief zones also affect the reservoir pressure. Unlike faults and fractures, whose location can often be ascertained from seismic measurements, thief zones are generally not visible in seismic or other images, and their exact distribution within the field is therefore unknown. The effect of the thief zones on fluid circulation and production from the reservoir can nonetheless be taken into account by populating the field with a model distribution that, though generally different from the unknown true distribution, is consistent with observable data. In accordance with various embodiments, conventional geomodeling techniques known to those of ordinary skill in the art are augmented with an approach that combines parameterization, statistical distributions, and numerical optimization to improve the modeling of the thief zones, as explained in detail further below.

The computational model of the hydrocarbon field further includes equations that describe fluid flow through the field. These equations, in conjunction with the petrophysical and other model parameters, allow simulating the reservoir response to a production operation and, thus, computing production levels and related data (e.g., bottom-hole pressure data) as a function of time. At least some of the model parameters are generally variable (rather than fixed at the outset based on reliable information) and can be adjusted to match the computed production data to measured production data. To facilitate such history matching, the method 100 further includes, as a preparatory act 104, obtaining production history data as well as supplemental data that can be used to constrain the thief-zone distribution. Production history data, as used herein, includes (usually bottom-hole) pressure data as well as the production rates or volumes of the hydrocarbons (e.g., oil and/or gas), or data derived therefrom (such as the water cut, i.e., the fraction of water within the total fluid produced).

Figure 2:
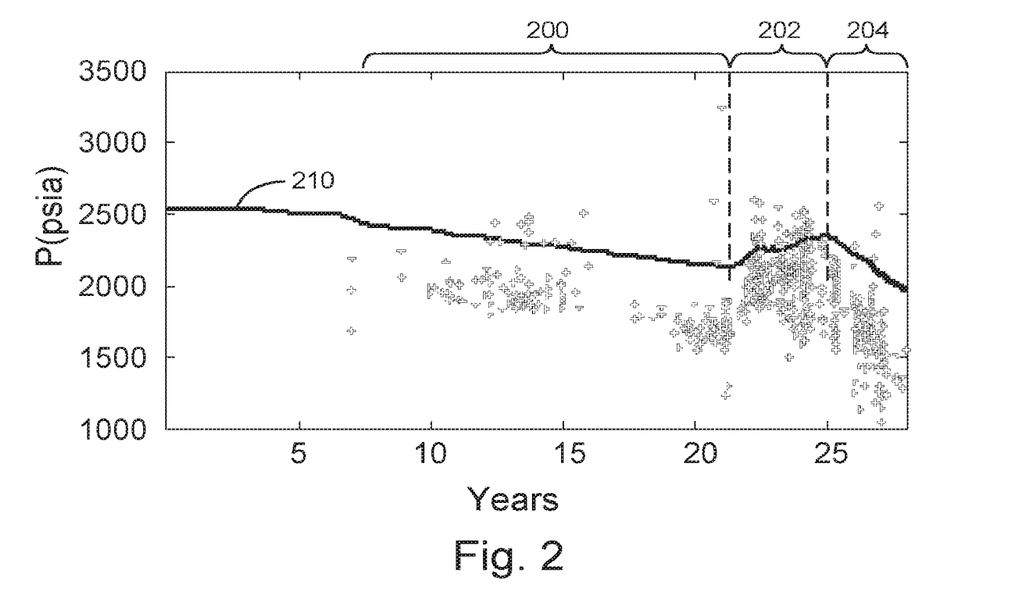
FIG. 2 is a graph of example historical field pressure data for a hydrocarbon field, illustrating field pressure matching in successive depletion and water-flooding phases, in accordance with various embodiments.

FIG. 2 is a graph of example pressure history data for a hydrocarbon field over the course about thirty years. The data includes, for multiple points in time, bottom-hole pressures measured simultaneously in multiple individual wells within the field (each pressure measurement being indicated by a dot in the graph). From these simultaneous measurements for multiple wells, which tend to be clustered, an average field pressure can be computed. Within the time-dependent variation of the field pressure, a number of phases can be distinguished. In the first phase (200), the pressure gradually decreases, reflecting depletion of the hydrocarbons resulting from their production; this phase is therefore called the depletion phase. In the second phase (202), the pressure increases due to water injection into the reservoir; this phase is referred to as the water-flooding phase. The third phase (204), during which the pressure decreases again, corresponds to secondary depletion once water cuts are high and the field experiences water circulation.

Figure 3:
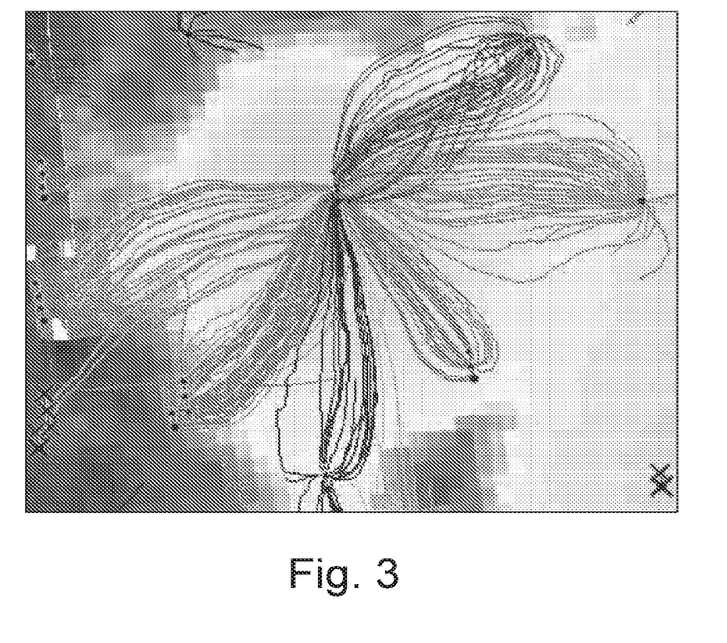
FIG. 3 is a two-dimensional map of example streamline trajectories as may be used to populate a hydrocarbon field model with thief zones, in accordance with various embodiments.

The supplemental data may come from various sources of information, such as from production logging tools that measure fluid production as a function of depth within the well, which allows the locations of thief zones to be "pinned" to a well at depths where fluid production is significantly lower or higher than in other portions along the well. The permeability of these thief zones at the well locations can be back-calculated for producing intervals from the PLT data, e.g., using a modified Darcy's flow equation and a flow rate calculated from spinner data acquired in a standard production logging run. A range of thief-zone permeability values may also be derived from core-plug data. Connectivity between different wells can be detected based on tracer data, that is, measurements of the concentration of a tracer chemical that is injected into the fluid at one location and distributed through the field along with the fluid flow. In the absence of tracer data, streamline trajectories determined by simulation based on the computational model of the hydrocarbon field can be used to identify connections, in accordance with methods known to those of ordinary skill in the art (e.g., as described in Singh, A. P. et al., "History Matching Using Streamline Trajectories," Paper SPE-172146-MS presented at the Abu Dhabi International Petroleum Exhibition and Conference, Abu Dhabi, UAE, Nov. 10-13, 2014). Such streamline trajectories identify a preferential fluid flow path that can serve as a guide to model thief-zone connections. FIG. 3 is a two-dimensional map of example streamline trajectories as may be used to populate a field model with thief zones, in accordance with various embodiments.

With renewed reference to FIG. 1, once the model of the hydrocarbon field has been generated (act 102) and a basic level of calibration has been performed to reduce the mismatch between oil, water cut, and field pressure (not shown), the variable model parameters can be adjusted in two stages. In the first stage (act 106), field-level parameters (such as, e.g., pore volume, fluid properties, faults transmissibility, and average thief-zone permeability) are adjusted based on field-level production history data.

In the second stage (acts 108-116), parameters of the thief-zone distribution are adjusted based on well-by-well history matching. More specifically, this second stage involves creating a plurality (usually a large number, e.g., hundreds) of model thief-zone distributions (act 108), with parameters constrained by the available supplemental data (e.g., PLT data, tracer data, and/or streamline trajectories). For each thief-zone distribution, one or more two-dimensional permeability maps corresponding to the spatial distribution of the permeability in horizontal planes at one or more respective depths below surface are computed based on the parameters for the model thief-zone distribution (which specify, e.g., the thickness, extent, location, orientation, and permeability distribution) (act 110). The permeability maps are then parameterized (act 112), e.g., using DCT (discrete cosine transform) or another mathematical transform, resulting in a two-dimensional "parameter space" or "transform coefficient space," and the dimensionality of the transform coefficient space is reduced by retaining only the largest transform coefficients, which have the greatest impact on the permeability maps. This compression reduces the computational cost of the following acts. (Herein, the term "transform coefficient space" is used, instead of "parameter space," to avoid confusion of the coefficients resulting from the permeability-map parameterization with the parameters of the computational model of the hydrocarbon field.) The transform coefficients are then aggregated across the model thief-zone distributions from which they are derived to obtain a statistical distributions for each coefficient (act 114). The transform coefficient distributions serve as a sampling space for the subsequent numerical optimization procedure, in which the selection of coefficients from the transform coefficient distributions, and thus the computational model of the hydrocarbon field, is iteratively adjusted to match production history data simulated based on the model against measured production history data for the individual wells (act 116). Example embodiments of various steps of the method 100 are described in more detail in the following.

Figure 4:
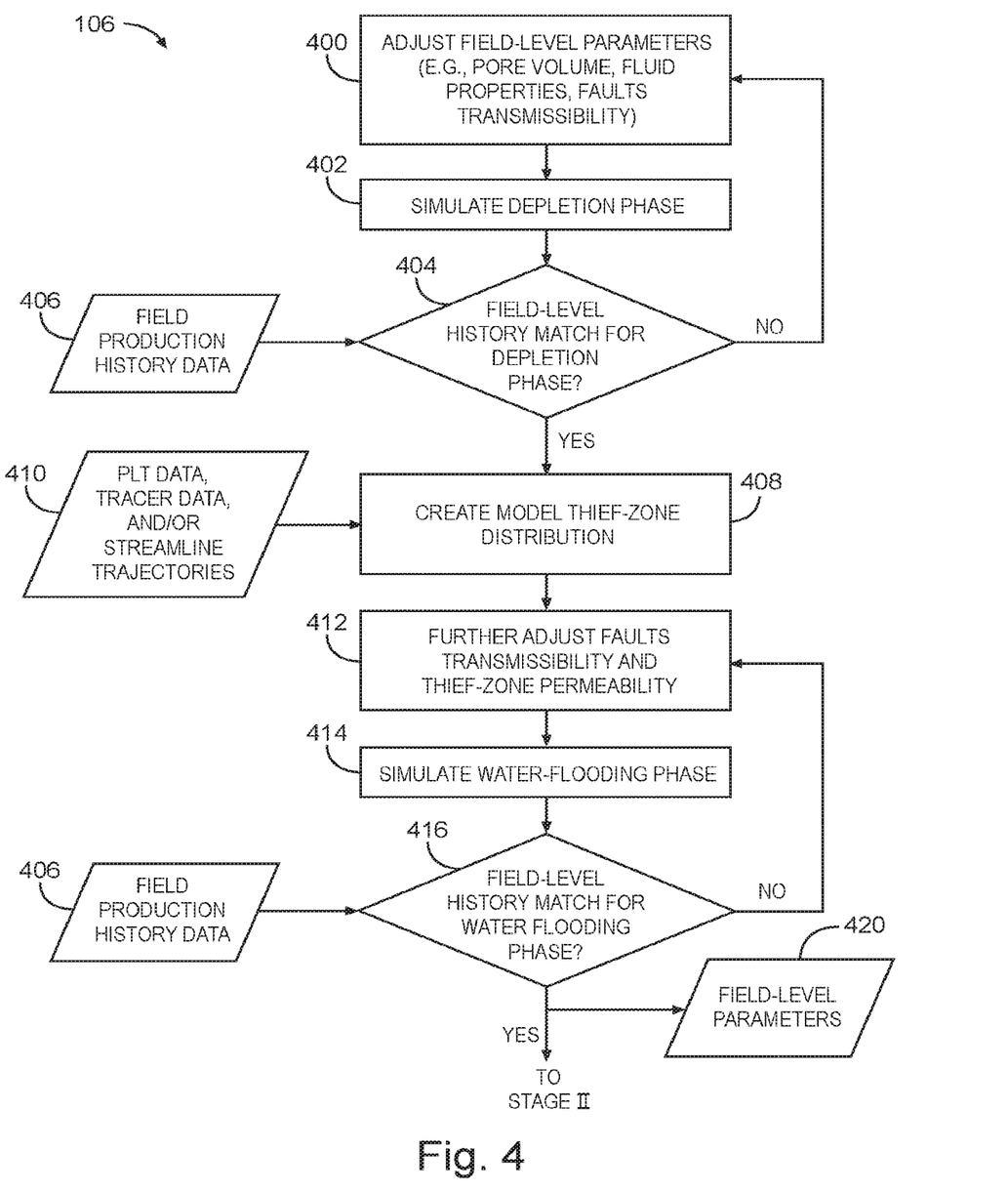
FIG. 4 is a flow chart of an example method for field-level history matching during a first stage of the method of FIG. 1, in accordance with various embodiments.

FIG. 4 is a flow chart of an example method 106 for field-level history matching during the first stage of the method of FIG. 1, in accordance with various embodiments. The method 106 involves adjusting model parameters successively based on production history data for the depletion phase 200 and the water-flooding phase 202. Based on an initial field model (that need not yet account for any thief zones), certain field-level parameters, such as, e.g., average values of the reservoir pore volume, faults transmissibility, and/or fluid properties are adjusted, usually within known uncertainty ranges (e.g., as obtained, for oil properties, from data provided by the American Petroleum Institute), to history match production data (including, e.g., pressure data). This process involves iteratively adjusting the field-level parameters (act 400), simulating the depletion-phase reservoir response (act 402), which includes computing production history data, and comparing the simulated production history data, at 404, against measured field-level production history data 406 until simulated and measured data converge (e.g., until a suitable metric of the difference between simulated and measured data falls below a specified tolerance threshold or undergoes changes, between successive iterations, that are below a specified differential threshold).

Following history matching for the depletion phase, the model is populated with thief zones (act 408) by specifying thief-zone parameters, such as the locations, orientations, thicknesses and lateral extents, and/or permeability distributions of the thief zones, guided by PLT data, tracer data, streamline trajectories, and/or other types of supplemental data 410. Creating a model thief-zone distribution consistent with the supplemental data may involve a series of steps, such as, in one embodiment, using tracer data and water salinity, or in the absence of tracer data simulated streamline trajectories, to identify connections between wells where water is injected and wells from which fluids are produced; identifying layers that are injecting and receiving most of the water using PLT-derived permeability logs; and, based on the previous steps, developing and executing a logical script to create thief-zone connections from sources to producers.

Once the hydrocarbon field model has thus been updated to include thief zones, the model is refined by further adjusting certain field-level parameters, such as the faults transmissibility and mean thief-zone permeability, to match observed and simulated production history data for the water-flooding phase 202. Again, this is performed iteratively by adjusting the field-level parameters (act 412), simulating the reservoir response to water-flooding to compute production history data for the water-flooding phase (act 414), and determining, at 416 whether the simulated production history data matches the measured production history data 406 at field level. For reservoirs with faults, the fault transmissibility is usually a key parameter for pressure matching during the water-flooding phase. Low faults transmissibility tends to confine injected water within intersecting faults, resulting in increased pressure, and high fault transmissibility tends to cause a pressure decrease within the intersecting faults. Upon convergence of simulated and observed field-level production history data, the adjusted field-level parameters 420 may be fixed in the model, and provided as input to the second stage.

Production history matching as performed, e.g., for the depletion phase in acts 400-404 and for the water-flooding phase in acts 412-416 can in principle be based on any or all of the available measured production history quantities (e.g., pressures and/or production rates). FIG. 2 illustrates, for example, field-level pressure matching. The solid line 210 indicates a simulated pressure response, which, in the depicted example, is higher than the average measured pressure. Accordingly, calibration and/or parameter adjustments may be made to lower the simulated pressure. Similarly, field-level hydrocarbon production rates or volumes and/or water cut may be matched. Using all available information may be beneficial since the accuracy of the model generally increases with the amount of information on which parameter adjustments are based.

Figure 5A:
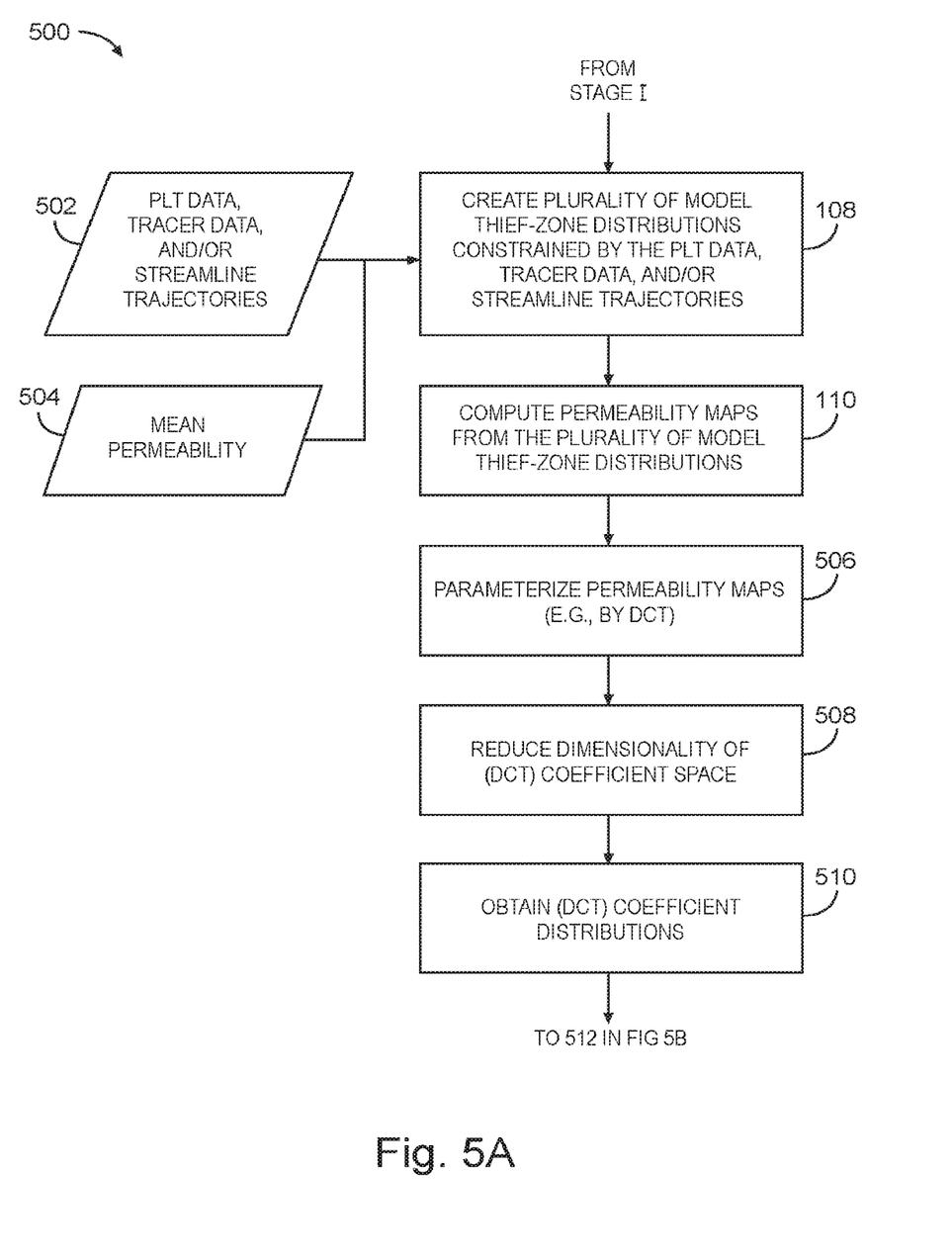
FIGS. 5A and 5B depict a flow chart of a method for history matching thief-zone parameters during a second stage of the method of FIG. 1, in accordance with various embodiments.
Figure 5B:
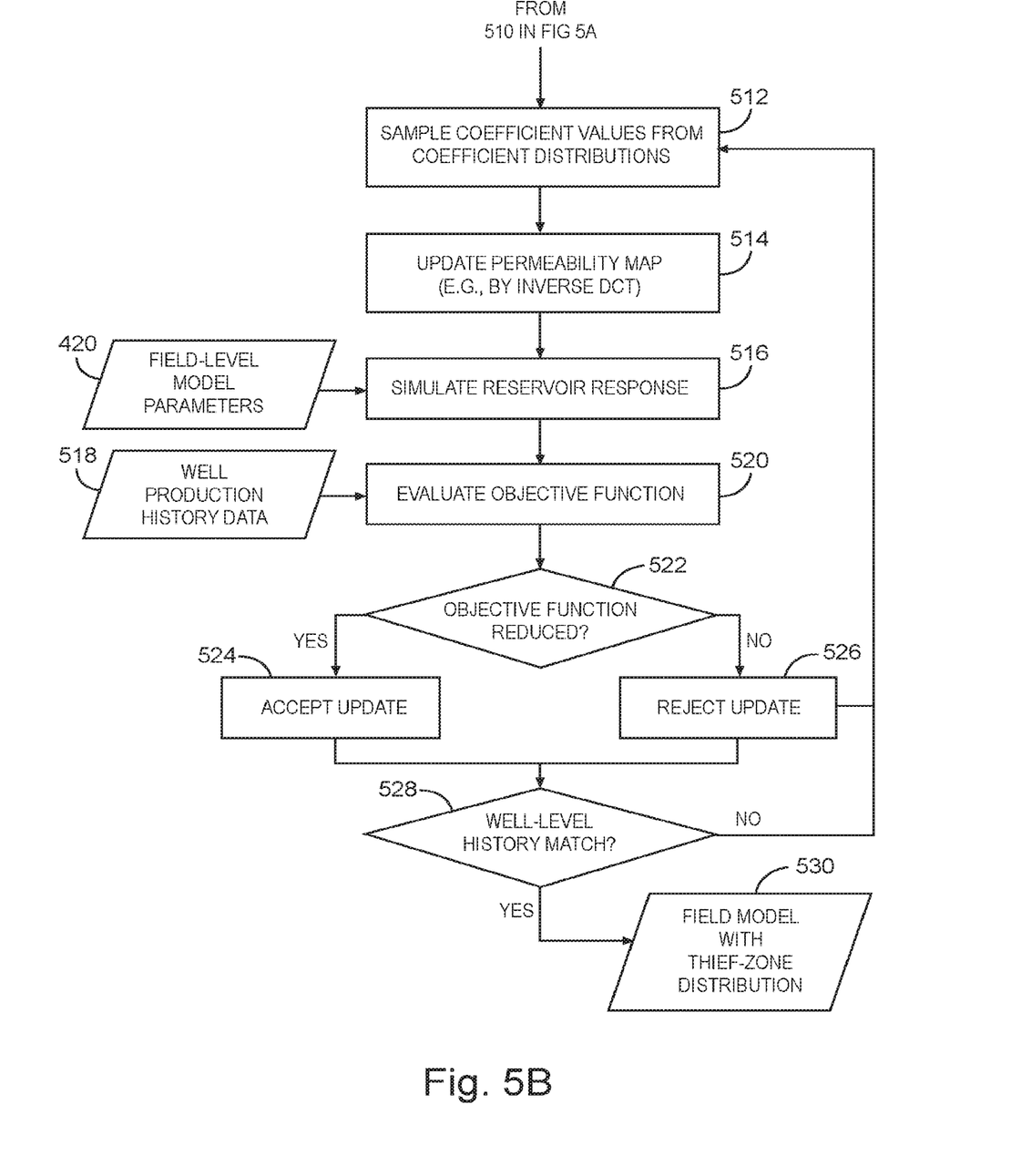

FIGS. 5A and 5B depict a flow chart of a method 500 for history matching thief-zone parameters during a second stage of the method of FIG. 1, in accordance with various embodiments. At a high level, the objective of the method 500 is to optimize the thief-zone parameters of the model, using, e.g., a Markov-chain Monte-Carlo (MCMC) optimization scheme or other probabilistic method, to cause convergence between simulated and observed well-by-well production history data, which are highly sensitive to the spatial thief-zone distribution and the permeability distributions within the thief zones. Beneficially, MCMC optimization is rigorous; however, it can be slow in convergence. To reduce the computational cost of the optimization, in some embodiments, only a small number of production history parameters are used. For example, in one embodiment, only bottom-hole pressures and water cut are matched. Also, in some embodiments only a subset of the thief-zone parameters (such as thickness and permeability distribution) are varied while other parameters are held fixed. This makes sense if the uncertainty of the fixed parameters is small compared to that of the variable parameters, e.g., if the orientation of the thief zones is more or less known.

For a given model thief-zone distribution with specified thief-zone parameters, the spatial permeability distribution across the hydrocarbon field (which generally exhibits high permeability in thief zones and low permeability in the surrounding formation) can be computed for subsequent use in simulating the reservoir response. At a suitable spatial discretization, the number of permeability values can be very large, even for a two-dimensional permeability map associated with a selected layer of the hydrocarbon reservoir (e.g., corresponding to a horizontal plane at a certain depth). However, using a suitable mathematical transform, salient features of the permeability map can be extracted in the coefficient space resulting from the transform, allowing the dimensionality of the problem to be reduced. In accordance with various embodiments, the optimization scheme is not applied directly to the thief-zone parameters, but to such salient features derived from permeability maps computed based on thief-zone distributions.

In more detail, the method 500 begins, in preparation for the optimization, with the creation of multiple, and usually a large number (such as tens, hundreds, or even thousands), of model thief zone distributions, with one or more thief-zone parameters varying within specified ranges (act 108). Parameters in which the thief-zone distributions may vary include, without limitation, the thickness, lateral extent in one or two dimensions, orientation, mean value of permeability, and/or permeability distribution within the thief zones. The ranges in which the parameters may vary are constrained by geological evidence reflected in the supplemental data 502. Permeability values may, for instance, be constrained based on PLT-derived permeability log data, and may further be informed by the mean permeability 504 computed in the first stage. Using the thief-zone parameters, one or more permeability maps are then computed for each model thief-zone distribution (act 110). In some embodiments, the three-dimensional hydrocarbon field is represented as a stack of layers, and a permeability map is computed for each layer (and each thief-zone distribution). In other embodiments, permeability maps are computed only for selected thief-zone-containing layers.

The permeability maps are parameterized by a suitable mathematical transform (act 506), resulting in a map of transform coefficients for each permeability map. In accordance with various embodiments, DCT is used to obtain DCT coefficients. (DCT and its inverse are known to those of ordinary skill in the art and described, e.g., in Rao, K. R. et al., "Discrete cosine transform: algorithms, advantages, applications," Academic Press Professional, Inc., 1990.) Alternatively, Fourier transform may be used. In the transform coefficient maps, coefficients with higher values, which generally correspond to the salient features of the permeability maps, may be concentrated in certain regions. The dimensionality of the transform coefficient space can therefore be reduced (act 508) by retaining only these high-value regions (and setting other portions of the transform coefficient maps to zero). After such compression, application of the inverse transform to a transform coefficient map results in a permeability map that still resembles the original permeability map to a high degree.

Figure 6A:
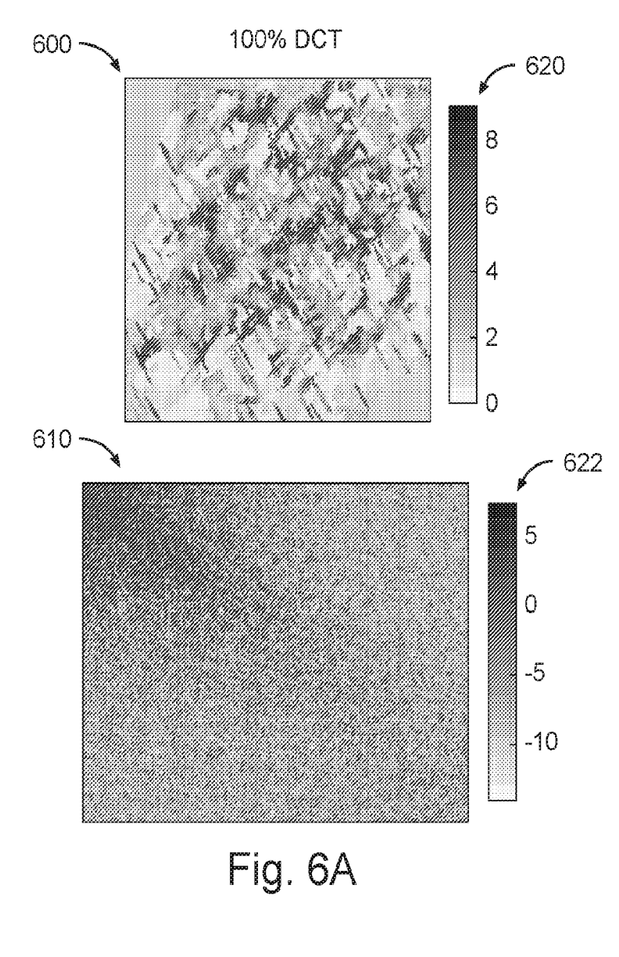
FIGS. 6A-6D are example thief-zone permeability maps and associated discrete-cosine-transform (DCT) coefficient maps for four respective compression levels, in accordance with various embodiments.
Figure 6B:
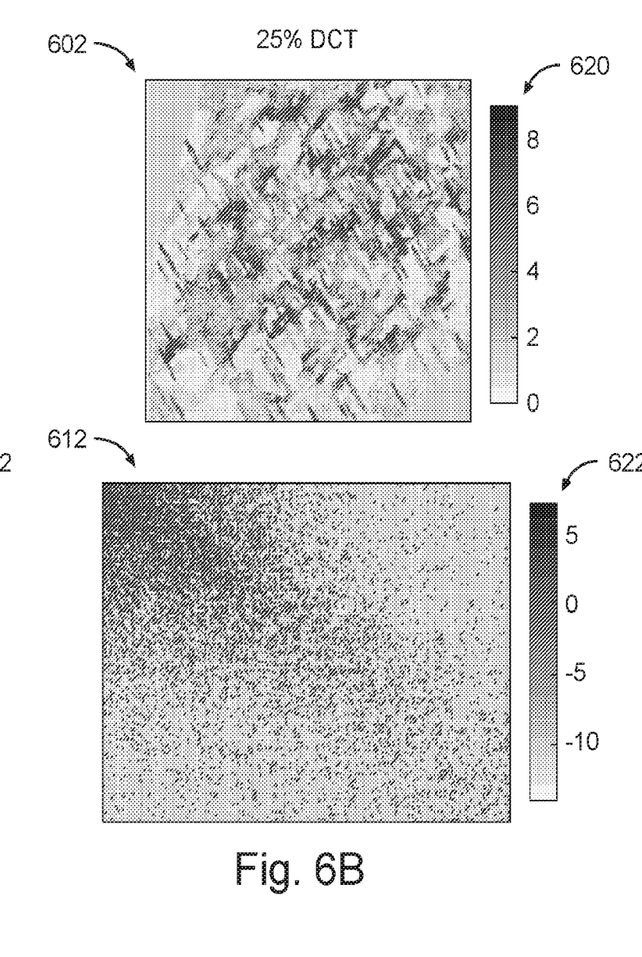
Figure 6C:
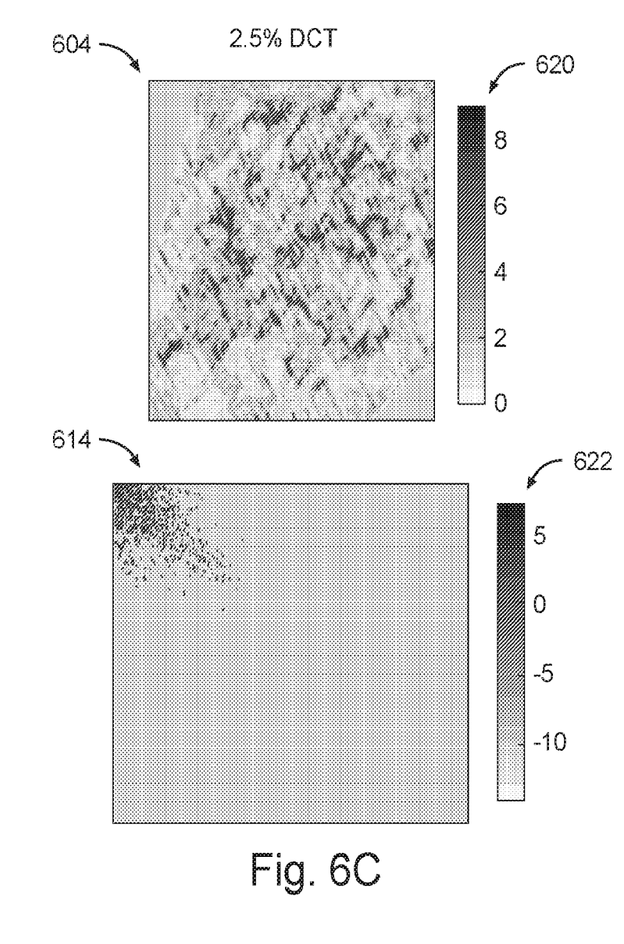
Figure 6D:
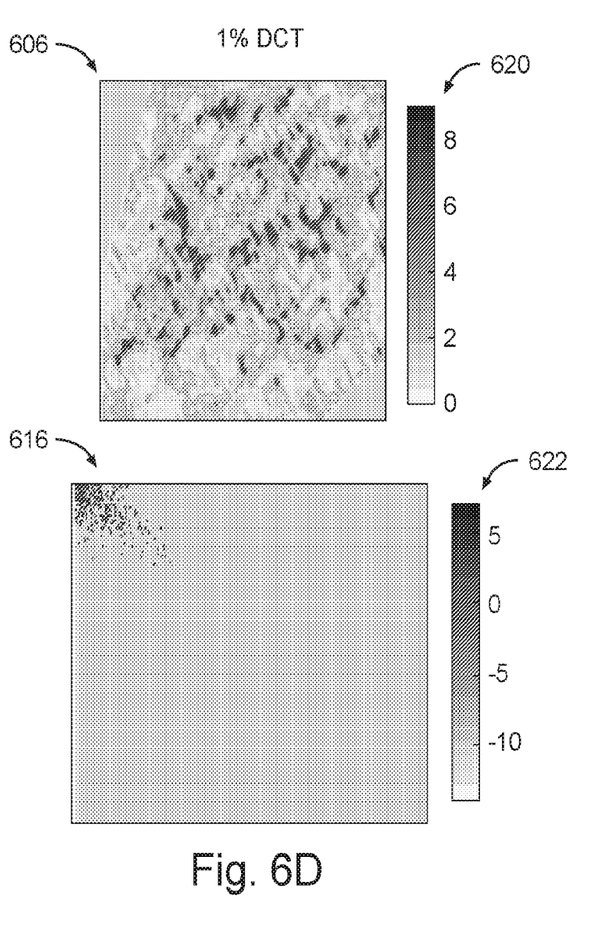

FIGS. 6A-6D show example thief-zone permeability maps 600, 602, 604, 606 and associated DCT coefficient maps 610, 612, 614, 616 for four respective compression levels. As the legends 620, 622 indicate, darker points in the maps correspond to higher permeability or higher coefficient values, respectively. Accordingly, thief zones, which are high-permeability streaks, appear as dark lines within the permeability maps 600, 602, 604, 606. The depicted maps 600, 602, 604, 606 show a thief-zone distribution with many tens of thief zones oriented largely in parallel and highly interconnected. In the (uncompressed) DCT coefficient map 610 shown in FIG. 6A, high coefficient values are concentrated in the upper left corner, which corresponds to low-frequency coefficients. FIGS. 6B-6D illustrate various levels (25%, 2.5%, and 1%, respectively) of compression that retain only the largest DCT coefficients in the DCT coefficient maps 612, 614, 616. Also shown are the permeability maps 602, 604, 606 obtained from the compressed DCT coefficient maps 612, 614, 616 by inverse DCT. As is evident from comparisons of FIGS. 6A-6D, high levels of compression are possible without a significant loss of connectivity in the permeability maps and distortion from the original permeability distribution 600.

Figure 7:
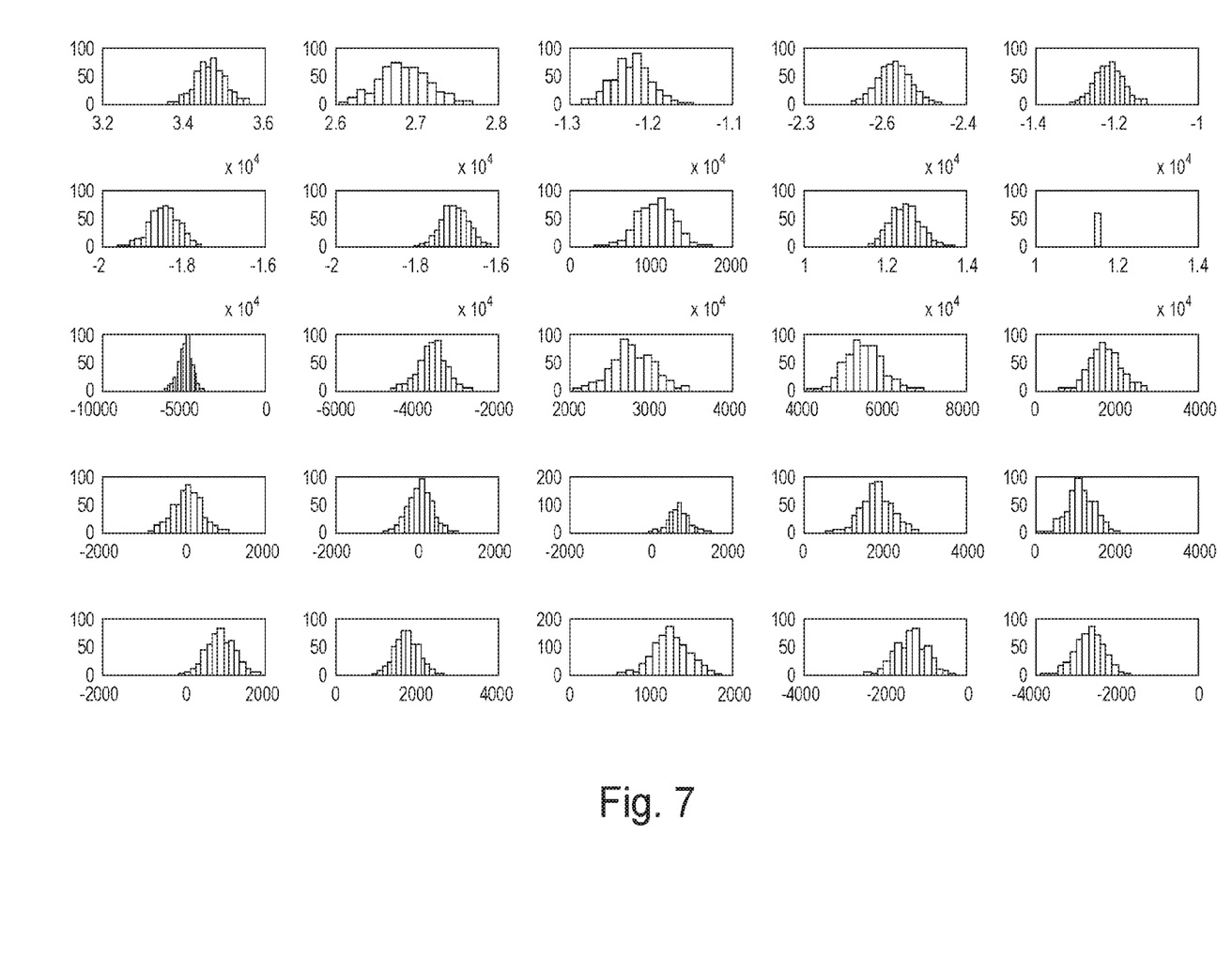
FIG. 7 is a set of example histograms for twenty-five DCT coefficients, as may be derived from a plurality of model thief-zone distributions, in accordance with various embodiments.

With reference again to FIG. 5A, the dimensionally reduced (i.e., compressed) transform coefficient spaces are aggregated across the plurality of model thief-zone distributions to obtain, for each transform coefficient, a distribution of possible values (act 510). These coefficient spaces constitute the sampling space for the optimization procedure. FIG. 7 illustrates an example sampling space in the form of histograms for twenty-five DCT coefficients, as may be derived from a plurality of model thief-zone distributions, in accordance with various embodiments. As will be appreciated, compressing the transform coefficient space reduces the sampling space, which, in turn, contributes to faster convergence during history matching. In particular, as can be seen from FIGS. 6A-6D, a suitable thief-zone distribution can be generated from few low-frequency DCT coefficients, and hence it suffices for history matching to adjust only those low-frequency coefficients. This tends to reduce the number of iterations performed until the specified level of convergence is achieved.

As illustrated in FIG. 5B, the numerical optimization procedure involves (e.g., randomly) sampling the distributions of transform coefficients (act 512), and updating the permeability map based on the selected coefficient values (act 514). More specifically, in an MCMC optimization procedure, the transform coefficient map is updated in each iteration by computing a weighted sum of the transform coefficient map from the previous iteration and a transform coefficient map randomly sampled from the transform coefficient distributions. In matrix notation:

$$C_{i+1} = (1-\delta)C_i + \delta C_i^{sam}$$

Herein, $C \in \Re^{M \times N}$ is the two-dimensional transform coefficient matrix for a layer within the hydrocarbon field model, M and N are the number of grid cells in the x-y direction within the modeled layer, i is the iteration number, $\delta$ is the step size (which determines the relative weights between the newly sampled values and the values of the previous iteration), and $C^{sam} \in \Re^{M \times N}$ is the transform coefficient matrix sampled from the distributions built based on the plurality of permeability models. The updated permeability map is obtained by applying the inverse transform (e.g., inverse DCT) to the updated (discrete cosine) transform coefficient map.

In each iteration, the reservoir is simulated (act 516) based on the updated permeability map and the field-level model parameters 420 determined in the first stage to compute well-by-well production history data. The difference between the simulated production history and the observed production history 518 can be quantified by evaluating a suitably defined objective function (also sometimes referred to as a cost function) (act 520). In one embodiment, the objective function is defined as the weighted sum of an absolute error between simulated values and observed values for water cut and bottom-hole pressure for each well, according to:

$$\text{Obj\_fun} = \underbrace{\frac{1}{n}\sum_{t=1}^{n}\sum_{i=0}^{T}\left|\frac{WCCT_{obs}^i(t) - WWCT_{sim}^i(t)}{WWCT_{obs}^i(t)}\right|}_{water\ cut\ misfit} +$$

$$\underbrace{\alpha\frac{1}{n}\sum_{t=1}^{n}\sum_{i=0}^{T}\left|\frac{WBHP_{obs}^i(t) - WBHP_{sim}^i(t)}{WBHP_{obs}^i(t)}\right|}_{BHP\ misfit}$$

Herein, operator | | indicates the absolute error; index limits n and T are the total numbers of producing wells and points in time, respectively, that are included in the history matching; $\alpha$ represents a weight of the bottom-hole pressure (BHP) misfit relative to the water cut misfit; the subscripts "obs" and "sim" stand for observed values and simulated values, respectively; WWCT denotes the well water cut; and WBHP denotes the well bottom-hole pressure. If the updated permeability map results in a reduction in the objective function (as determined at 522), the updated model is accepted (524); otherwise, the update is rejected and the transform coefficient map (and thereby the permeability map) is reset to that of the previous iteration (526). Iterations are performed until the desired level of history matching is achieved, which may be determined (at 528) by comparison of the value of the objective function against an absolute threshold, or by comparison of the change in the objective function against a difference threshold indicative of convergence. Once history matching has been achieved in accordance with the specified threshold, the final field model, including the final thief-zone distribution (as reflected in the permeability map) can be output (act 530).

Figure 8:
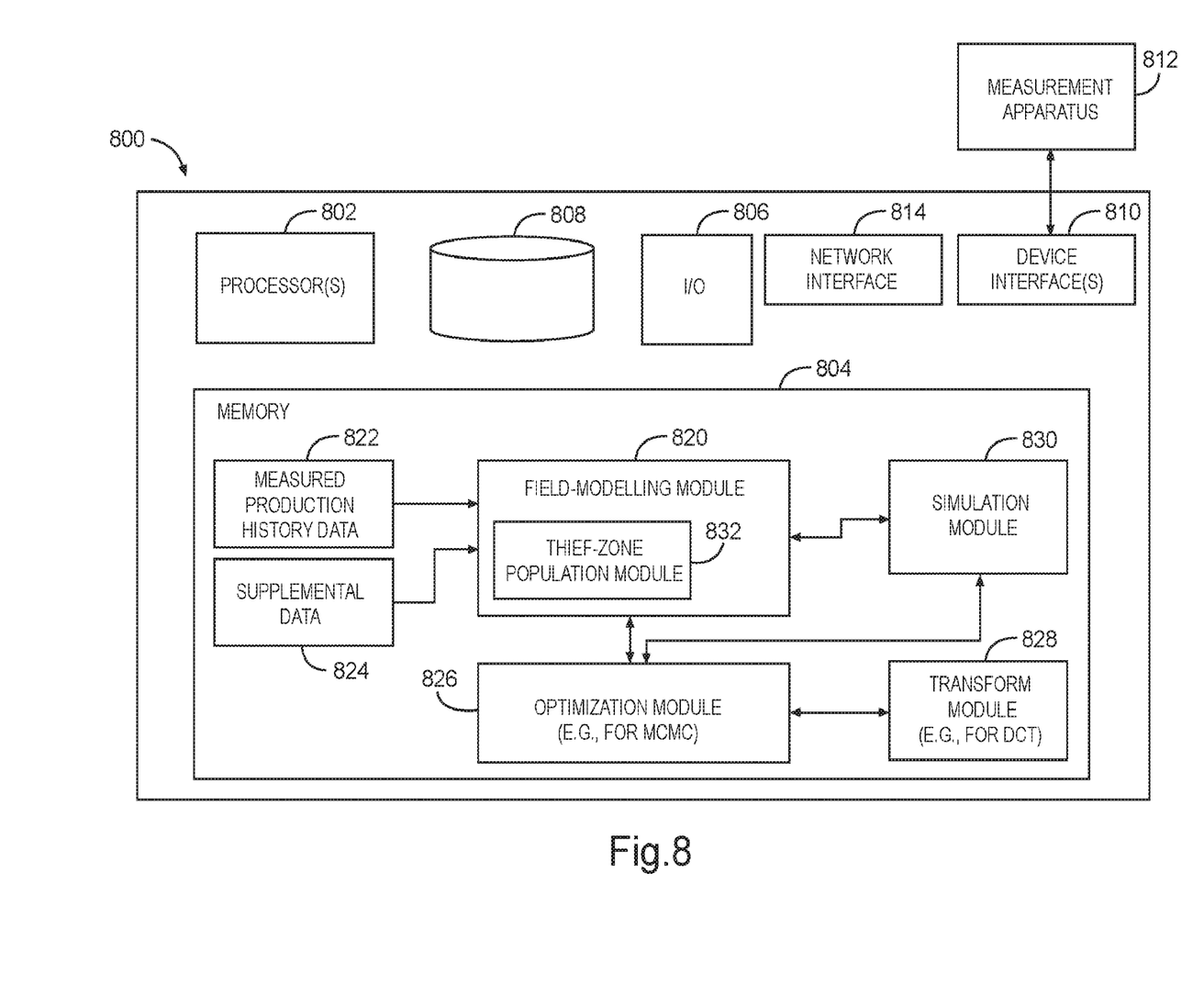
FIG. 8 is a block diagram of an example computer system for implementing the methods of FIGS. 1, 2, 5A and 5B, in accordance with various embodiments.

The computational functionality described herein can generally be implemented with computing hardware and/or software, including special-purpose circuitry (such as, e.g., a digital signal processor, application-specific integrated circuit, field-programmable gate arrays, etc.) and/or suitably programmed general-purpose computers. FIG. 8 is a block diagram of an example computer system 800 for implementing the methods of FIGS. 1, 4, 5A and 5B. The computer system 800 includes one or more processors 802 (e.g., a conventional central processing unit (CPU), graphical processing unit, or other) configured to execute software programs stored in memory 804 (which may be, e.g., random-access memory (RAM), read-only memory (ROM), flash memory, etc.). Further, computer system 800 may include user input/output devices 806 (e.g., a screen, keyboard, mouse, etc.), permanent data-storage devices 808 (such as, e.g., a hard drive, disk drive, etc.), device interfaces 810 for communicating with one or more measurement apparatus 812 that provide the production history data and/or supplemental data (or a portion thereof), a network interface 814 that facilitates communication with other computer systems and/or data repositories (which may be located "in the cloud," e.g., for the purpose of downloading production history data and/or supplemental data therefrom for storage on the data-storage device 808 or directly in memory 804), and a system bus (not shown) through which the other components communicate.

The software programs stored in the memory 804 include processor-executable instructions for performing the methods described herein, and may be implemented in any of various programming languages, for example and without limitation, C, C++, Object C, Pascal, Basic, Fortran, Matlab, and Python. The instructions may be grouped in various functional modules, e.g., for the purpose of re-use and sharing of the functionality of certain modules between other modules that utilize it. In accordance with the depicted embodiment, the modules include, for instance, a field-modeling module 820 that generates the computational model of the hydrocarbon field and manages adjustment of the field-level and thief-zone parameters based on input of the measured production history data 822 and supplemental data 824; a numerical optimization module 826 that implements, specifically, the iterative optimization scheme for obtaining the thief-zone-based permeability map (e.g., as described in FIG. 5B); a transform module 828 that implements the mathematical transform (e.g., DCT) to convert, when called by the optimization module 826, permeability maps to transform coefficient maps and transform coefficient maps back to permeability maps; and a simulation module 830 that receives a version of the computational module as input from, and returns the simulated production history to, the field-modeling module 820 or optimization module 826. The field-modeling module 826 may include, as a sub-module, a thief-zone population module 832 that implements geomodeling techniques to determine thief-zone parameters for a thief-zone distribution, constrained by the supplemental data 824. Of course, the depicted organization into modules are merely one non-limiting example of ways in which instructions the implement the disclosed functionality can be grouped.

The following numbered examples are illustrative embodiments:

1. A method comprising: creating a computational model of a hydrocarbon field comprising a plurality of wells, the model comprising a plurality of thief-zone parameters; obtaining data for the hydrocarbon field, the data comprising measured production history data for the plurality of wells and thief-zone-related supplemental data; and, using at least one processor, optimizing a permeability map for the computational model of the hydrocarbon field by creating a plurality of model thief-zone distributions that vary in values of the thief-zone parameters, the thief-zone parameters being constrained by the supplemental data, computing permeability maps across the hydrocarbon field from the plurality of model thief-zone distributions, parameterizing the permeability maps by a mathematical transform to obtain transform coefficients and reducing a dimensionality of a resulting transform coefficient space, aggregating the transform coefficients within the reduced transform coefficient space across the model thief-zone distributions to obtain transform coefficient distributions, and determining the optimized permeability map for the computational model using numerical optimization based on an objective function that measures a deviation between the measured production history data and simulated production history data derived from the computational model based at least in part on the transform coefficient distributions.

2. The method of example 1, wherein the supplemental data comprises at least one of production-logging-tool data, tracer data, or simulated streamline trajectories.

3. The method of example 1 or example 2, wherein the mathematical transform is discrete cosine transform.

4. The method of any preceding example, wherein the numerical optimization comprises Markov-chain Monte-Carlo optimization.

5. The method of any preceding example, wherein determining the optimized permeability map comprises sampling the transform coefficient distributions, updating the permeability map based on the sampling, and computing the simulated production history data from the computational model as updated with the updated permeability map.

6. The method of example 5, wherein updating the permeability map comprises updating a transform coefficients map based on the sampling and applying an inverse of the mathematical transform to the transform coefficient map to obtain the updated permeability map.

7. The method of any preceding example, wherein the computational model of the hydrocarbon field further comprises a plurality of field-level parameters, the method further comprising adjusting the plurality of field-level parameters at least in part based on the measured production history data prior to determining the optimized permeability map.

8. The method of example 7, wherein adjusting the plurality of field-level parameters comprises initially adjusting the plurality of field-level parameters based on a depletion-phase portion of the measured production history data in conjunction with an initial model of the hydrocarbon field that does not account for thief zones.

9. The method of example 8, wherein adjusting the plurality of field-level parameters further comprises supplementing the initial model with a model thief-zone distribution and thereafter refining at least one of the field-level parameters based on a water-flooding-phase portion of the measured production history data.

10. The method of example 7, wherein the field-level parameters are adjusted based on production-history data aggregated across the wells and the permeability map is optimized based on separate production-history data for the individual wells.

11. A system comprising one or more processors and memory storing processor-readable instructions that, when executed by the one or more processors, cause the one or more processors to: create a computational model of a hydrocarbon field comprising a plurality of wells, the model comprising a plurality of thief-zone parameters; obtain data for the hydrocarbon field, the data comprising measured production history data for the plurality of wells and thief-zone-related supplemental data; and optimize a permeability map for the computational model of the hydrocarbon field by creating a plurality of model thief-zone distributions that vary in values of the thief-zone parameters, the thief-zone parameters being constrained by the supplemental data, computing permeability maps across the hydrocarbon field from the plurality of model thief-zone distributions, parameterizing the permeability maps by a mathematical transform to obtain transform coefficients and reducing a dimensionality of a resulting transform coefficient space, aggregating the transform coefficients within the reduced transform coefficient space across the model thief-zone distributions to obtain transform coefficient distributions, and determining the optimized permeability map for the computational model using numerical optimization based on an objective function that measures a deviation between the measured production history data and simulated production history data derived from the computational model based at least in part on the transform coefficient distributions.

12. The system of example 11, wherein the supplemental data comprises at least one of production-logging-tool data, tracer data, or simulated streamline trajectories.

13. The system of example 11 or example 12, wherein the mathematical transform is discrete cosine transform.

14. The system of any of examples 11-13, wherein the numerical optimization comprises Markov-chain Monte-Carlo optimization.

15. The system of any of examples 11-14, wherein the instructions that cause the one or more processors to determine the optimized permeability map comprise instructions to sample the transform coefficient distributions, update the permeability map based on the sampling, and compute the simulated production history data from the computational model as updated with the updated permeability map.

16. The system of any of example 11-15, wherein the computational model of the hydrocarbon field further comprises a plurality of field-level parameters, and wherein the memory further stores instructions which, when executed by the one or more processors, cause the one or more processors to adjust the plurality of field-level parameters at least in part based on the measured production history data prior to determining the optimized permeability map.

17. The system of example 16, wherein the instructions to adjust the plurality of field-level parameters comprise instructions to initially adjust the plurality of field-level parameters based on a depletion-phase portion of the measured production history data in conjunction with an initial model of the hydrocarbon field that does not account for thief zones.

18. The system of example 17, wherein the instructions to adjust the plurality of field-level parameters further comprise instructions to supplement the initial model with a model thief-zone distribution and thereafter refine at least one of the field-level parameters based on a water-flooding-phase portion of the measured production history data.

19. The system of example 16, wherein the instructions cause the one or more processors to adjust the field-level parameters based on production-history data aggregated across the wells and the permeability map based on separate production-history data for the individual wells.

20. A machine-readable medium storing instructions which, when executed by one or more processors of the machine, cause the one or more processor to: create a computational model of a hydrocarbon field comprising a plurality of wells, the model comprising a plurality of thief-zone parameters; obtain data for the hydrocarbon field, the data comprising measured production history data for the plurality of wells and thief-zone-related supplemental data constraining the thief-zone parameters; and optimize a permeability map for the computational model of the hydrocarbon field by creating a plurality of model thief-zone distributions that vary in values of the thief-zone parameters, computing permeability maps across the hydrocarbon field from the plurality of model thief-zone distributions, parameterizing the permeability maps by a mathematical transform to obtain transform coefficients and reducing a dimensionality of a resulting transform coefficient space, aggregating the transform coefficients within the reduced transform coefficient space across the model thief-zone distributions to obtain transform coefficient distributions, and determining the optimized permeability map for the computational model using numerical optimization based on an objective function that measures a deviation between the measured production history data and simulated production history data derived from the computational model based at least in part on the transform coefficient distributions.

Many variations may be made in the methods and systems described and illustrated herein without departing from the scope of the inventive subject matter. For example, it will be appreciated that embodiments of the inventive subject matter can include various sub-sets and combinations of the features of the embodiments specifically described herein. Accordingly, the scope of the inventive subject matter is to be determined by the scope of the following claims and all additional claims supported by the present disclosure, and all equivalents of such claims.

What is claimed is:
1. A computer-implemented method for estimating future hydrocarbon production from heterogenous reservoirs, the method comprising:
generating, by a computer system, a computational model of a hydrocarbon field comprising a plurality of wells, the computational model comprising a plurality of thief-zone parameters for thief zones distributed across different layers of the hydrocarbon field;
obtaining, by the computer system from one or more measurement devices associated with the plurality of wells, data for the hydrocarbon field, the data comprising measured production history data for the plurality of wells and supplemental data specifying measured value ranges for constraining the plurality of thief-zone parameters;
generating, by the computer system, a plurality of model thief-zone distributions that vary in values of the thief-zone parameters, the values of the thief-zone parameters being constrained by the supplemental data;

computing permeability maps for the plurality of model thief-zone distributions across the different layers of the hydrocarbon field as represented in the computational model;

parameterizing the permeability maps for the computational model by applying a mathematical transform to obtain transform coefficients that reduce a dimensionality of a resulting transform coefficient space for each permeability map;

aggregating the transform coefficients within the resulting transform coefficient space for each permeability map across the model thief-zone distributions to obtain transform coefficient distributions for the computational model;

simulating fluid production from the plurality of wells of the hydrocarbon field using the computational model with the obtained transform coefficient distributions;

determining an optimized permeability map for the computational model based on an objective function that measures a deviation between the measured production history data and simulated production history data derived from the simulated fluid production using the computational model with the transform coefficient distributions; and estimating, by the computer system, future production levels for the plurality of wells of the hydrocarbon field, based on the optimized permeability map of the computational model, wherein the estimated future production levels of the plurality of wells are used to perform production operations in the hydrocarbon field.

2. The method of claim 1, wherein the supplemental data comprises at least one of production-logging-tool data, tracer data, or simulated streamline trajectories.

3. The method of claim 1, wherein the mathematical transform is discrete cosine transform.

4. The method of claim 1, wherein the optimized permeability map is determined using numerical optimization, and the numerical optimization comprises Markov-chain Monte-Carlo optimization.

5. The method of claim 1, wherein determining the optimized permeability map comprises sampling the transform coefficient distributions, updating the permeability map based on the sampling, and computing the simulated production history data from the computational model as updated with the updated permeability map.

6. The method of claim 5, wherein updating the permeability map comprises updating a transform coefficients map based on the sampling and applying an inverse of the mathematical transform to the transform coefficient map to obtain the updated permeability map.

7. The method of claim 1, wherein the computational model of the hydrocarbon field further comprises a plurality of field-level parameters, the method further comprising adjusting the plurality of field-level parameters at least in part based on the measured production history data prior to determining the optimized permeability map.

8. The method of claim 7, wherein adjusting the plurality of field-level parameters comprises initially adjusting the plurality of field-level parameters based on a depletion-phase portion of the measured production history data in conjunction with an initial model of the hydrocarbon field that does not account for thief zones.

9. The method of claim 8, wherein adjusting the plurality of field-level parameters further comprises supplementing the initial model with a model thief-zone distribution and thereafter refining at least one of the field-level parameters based on a water-flooding-phase portion of the measured production history data.

10. The method of claim 7, wherein the field-level parameters are adjusted based on production-history data aggregated across the wells and the permeability map is optimized based on separate production-history data for the individual wells.

11. A system comprising:
one or more processors; and
a memory storing processor-readable instructions that, when executed by the one or more processors, cause the one or more processors to perform a plurality of functions, including functions to:

generate a computational model of a hydrocarbon field comprising a plurality of wells, the computational model comprising a plurality of thief-zone parameters for thief zones distributed across different layers of the hydrocarbon field;

obtain, from one or more measurement devices associated with the plurality of wells, data for the hydrocarbon field, the data comprising measured production history data for the plurality of wells and supplemental data specifying measured value ranges for constraining the plurality of thief-zone parameters;

generate a plurality of model thief-zone distributions that vary in values of the thief-zone parameters, the values of the thief-zone parameters being constrained by the supplemental data;

compute permeability maps for the plurality of model thief-zone distributions across the different layers of the hydrocarbon field as represented in the computational model;

parameterize the permeability maps for the computational model by applying a mathematical transform to obtain transform coefficients that reduce a dimensionality of a resulting transform coefficient space for each permeability map;

aggregate the transform coefficients within the resulting transform coefficient space for each permeability map across the model thief-zone distributions to obtain transform coefficient distributions for the computational model;

simulate fluid production from the plurality of wells of the hydrocarbon field using the computational model with the obtained transform coefficient distributions;

determine an optimized permeability map for the computational model based on an objective function that measures a deviation between the measured production history data and simulated production history data derived from the simulated fluid production using the computational model with the transform coefficient distributions; and estimate future production levels for the plurality of wells of the hydrocarbon field, based on the optimized permeability map of the computational model, wherein the estimated future production levels of the plurality of wells are used to perform production operations in the hydrocarbon field.

12. The system of claim 11, wherein the supplemental data comprises at least one of production-logging-tool data, tracer data, or simulated streamline trajectories.

13. The system of claim 11, wherein the mathematical transform is discrete cosine transform.

14. The system of claim 11, wherein the optimized permeability map is determined using numerical optimization, and the numerical optimization comprises Markov-chain Monte-Carlo optimization.

15. The system of claim 11, wherein the instructions that cause the one or more processors to determine the optimized permeability map comprise instructions to sample the transform coefficient distributions, update the permeability map based on the sampling, and compute the simulated production history data from the computational model as updated with the updated permeability map.

16. The system of claim 11, wherein the computational model of the hydrocarbon field further comprises a plurality of field-level parameters, and wherein the memory further stores instructions which, when executed by the one or more processors, cause the one or more processors to adjust the plurality of field-level parameters at least in part based on the measured production history data prior to determining the optimized permeability map.

17. The system of claim 16, wherein the instructions to adjust the plurality of field-level parameters comprise instructions to initially adjust the plurality of field-level parameters based on a depletion-phase portion of the measured production history data in conjunction with an initial model of the hydrocarbon field that does not account for thief zones.

18. The method of claim 17, wherein the instructions to adjust the plurality of field-level parameters further comprise instructions to supplement the initial model with a model thief-zone distribution and thereafter refine at least one of the field-level parameters based on a water-flooding-phase portion of the measured production history data.

19. The system of claim 16, wherein the instructions cause the one or more processors to adjust the field-level parameters based on production-history data aggregated across the wells and the permeability map based on separate production-history data for the individual wells.

20. A non-transitory machine-readable storage medium storing instructions which, when executed by one or more processors of the machine, cause the one or more processor to perform a plurality of functions, including functions to:

generate a computational model of a hydrocarbon field comprising a plurality of wells, the computational model comprising a plurality of thief-zone parameters for thief zones distributed across different layers of the hydrocarbon field;

obtain, from one or more measurement devices associated with the plurality of wells, data for the hydrocarbon field, the data comprising measured production history data for the plurality of wells and supplemental data specifying measured value ranges for constraining the plurality of thief-zone parameters;

generate a plurality of model thief-zone distributions that vary in values of the thief-zone parameters, the values of the thief-zone parameters being constrained by the supplemental data;

compute permeability maps for the plurality of model thief-zone distributions across the different layers of the hydrocarbon field as represented in the computational model;

parameterize the permeability maps for the computational model by applying a mathematical transform to obtain transform coefficients that reduce a dimensionality of a resulting transform coefficient space for each permeability map;

aggregate the transform coefficients within the resulting transform coefficient space for each permeability map across the model thief-zone distributions to obtain transform coefficient distributions for the computational model;

simulate fluid production from the plurality of wells of the hydrocarbon field using the computational model with the obtained transform coefficient distributions;

determine an optimized permeability map for the computational model based on an objective function that measures a deviation between the measured production history data and simulated production history data derived from the simulated fluid production using the computational model with the transform coefficient distributions; and estimate future production levels for the plurality of wells of the hydrocarbon field, based on the optimized permeability map of the computational model, wherein the estimated future production levels of the plurality of wells are used to perform production operations in the hydrocarbon field.

* * * * *